(12) United States Patent
Chu et al.

(10) Patent No.: US 10,370,015 B2
(45) Date of Patent: Aug. 6, 2019

(54) TRAIN TRAFFIC SITUATION DISPLAY SYSTEM

(71) Applicants: Shu Tong Chu, Hong Kong (CN); Qun Zhou, Hong Kong (CN)

(72) Inventors: Shu Tong Chu, Hong Kong (CN); Qun Zhou, Hong Kong (CN)

(73) Assignees: Shu Tong Chu, Hong Kong (CN); Qun Zhou, Hong Kong (CN)

( * ) Notice: Subject to any disclaimer, the term of this patent is extended or adjusted under 35 U.S.C. 154(b) by 0 days.

(21) Appl. No.: 15/950,673

(22) Filed: Apr. 11, 2018

(65) Prior Publication Data
US 2018/0290673 A1    Oct. 11, 2018

Related U.S. Application Data

(60) Provisional application No. 62/484,079, filed on Apr. 11, 2017.

(51) Int. Cl.
*B61L 23/34* (2006.01)
*B61L 25/08* (2006.01)
*B61L 25/02* (2006.01)
*G08G 1/00* (2006.01)
(Continued)

(52) U.S. Cl.
CPC .............. *B61L 23/34* (2013.01); *B61L 25/023* (2013.01); *B61L 25/08* (2013.01); *G08G 1/0965* (2013.01);
(Continued)

(58) Field of Classification Search
CPC ........ B61L 23/34; B61L 23/22; B61L 15/009; B61L 25/023; B61L 25/08;
(Continued)

(56) References Cited

U.S. PATENT DOCUMENTS 2,762,913 A * 9/1956 Jepson .................... B61L 23/34
340/903
4,403,208 A * 9/1983 Hodgson et al. ....... G08G 1/161
340/902

(Continued)

FOREIGN PATENT DOCUMENTS

CN    1124858 A    6/1996
CN    1325805 A    12/2001
(Continued)

OTHER PUBLICATIONS

Shi et al, espacenet translation of CN 10317596(A), (foreign document provided by applicant), Jun. 26, 2013, 22 pages (Year: 2013).*

*Primary Examiner* — Dale W Hilgendorf
(74) *Attorney, Agent, or Firm* — GableGotwals

(57) ABSTRACT

A method and system for determining a separation distance between a first object and a second object comprises using a search module associated with a first object comprising a first transponder having a unique address. The method includes using a reply module associated with a second object comprising a second transponder having a different, unique address. The method includes the search module transmitting a search signal on a first frequency, said search signal including the address of the first transponder and the address of the second transponder. The reply module receives the search signal and locally validates the address included in said received search signal for the second transponder, whereby, if the validation is positive; the reply module transmits a reply signal on a second, different frequency.

21 Claims, 11 Drawing Sheets

(51) Int. Cl.
  *G08G 1/16* (2006.01)
  *G08G 1/137* (2006.01)
  *G08G 1/123* (2006.01)
  *G08G 1/133* (2006.01)
  *G08G 1/0965* (2006.01)
  *G08G 1/0967* (2006.01)
  *G08G 1/0962* (2006.01)
  *G01S 19/46* (2010.01)
  *B61L 15/00* (2006.01)
  *B61L 23/22* (2006.01)

(52) U.S. Cl.
  CPC ... *G08G 1/09623* (2013.01); *G08G 1/096708* (2013.01); *G08G 1/096716* (2013.01); *G08G 1/096725* (2013.01); *G08G 1/123* (2013.01); *G08G 1/133* (2013.01); *G08G 1/137* (2013.01); *G08G 1/161* (2013.01); *G08G 1/163* (2013.01); *G08G 1/20* (2013.01); *G08G 1/22* (2013.01); *B61L 15/009* (2013.01); *B61L 23/22* (2013.01); *B61L 2205/04* (2013.01); *G01S 19/46* (2013.01); *G01S 2205/002* (2013.01)

(58) Field of Classification Search
  CPC .............. B61L 2205/04; G08G 1/0965; G08G 1/096725; G08G 1/096708; G08G 1/09623; G08G 1/096716; G08G 1/20; G08G 1/137; G08G 1/133; G08G 1/163; G08G 1/123; G08G 1/161; G08G 1/22; G01S 19/46; G01S 2205/002
  See application file for complete search history.

(56) References Cited

U.S. PATENT DOCUMENTS

| | | | | |
|---|---|---|---|---|
| 4,965,583 | A * | 10/1990 | Broxmeyer | B61L 23/34 342/42 |
| 6,130,626 | A * | 10/2000 | Kane et al. | G08G 1/096716 340/905 |
| 6,310,561 | B1 * | 10/2001 | Nomura et al. | G08G 1/096716 340/905 |
| 6,397,149 | B1 * | 5/2002 | Hashimoto | G05D 1/0297 701/300 |
| 2002/0070849 | A1 * | 6/2002 | Teicher et al. | B60Q 1/50 340/425.5 |
| 2003/0058131 | A1 | 3/2003 | Grisham et al. | |
| 2007/0233337 | A1 * | 10/2007 | Plishner | G05D 1/0295 701/23 |
| 2012/0035847 | A1 * | 2/2012 | Douglas et al. | B61L 23/34 701/301 |
| 2012/0038489 | A1 * | 2/2012 | Goldshmidt | G08G 1/163 340/903 |
| 2012/0296562 | A1 | 11/2012 | Carlson et al. | |
| 2016/0096537 | A1 * | 4/2016 | Bartek | B61L 15/0072 246/124 |

FOREIGN PATENT DOCUMENTS

| | | |
|---|---|---|
| CN | 102756747 A | 10/2012 |
| CN | 103818406 A | 5/2013 |
| CN | 103071596 A | 6/2013 |
| JP | 2011010515 A | 1/2011 |
| WO | 2016054495 A1 | 4/2016 |

* cited by examiner

TRAIN TRAFFIC SITUATION DISPLAY SYSTEM

CROSS-REFERENCE TO RELATED APPLICATIONS

This application claims priority to U.S. Provisional Application No. 62/484,079 filed Apr. 11, 2017 which is incorporated herein by reference.

FIELD OF THE INVENTION

The invention relates to a method and system for determining the position of a first object relative to a second object. The invention is more particularly related to a method and system for determining a position of a first vehicle such as a train with respect to the position(s) of one or more other vehicles in order to provide an operator/driver of a train with at least a traffic situation display.

BACKGROUND OF THE INVENTION

Despite the use of sophisticated safety systems including centrally controlled safety systems, train accidents continue to occur. These sometimes occur as a result of local failures in the centrally controlled safety systems. In February 2016, two commuter trains in southern Germany collided head-on in good weather resulting in at least ten dead. In the same year, a similar head-on collision between two trains occurred in Ruvo di Puglia and Corato, Italy causing twenty deaths and dozens injured. On 9 Oct. 2016, 33 people were injured in a collision of trains near New Hyde Park on Long Island when a track maintenance train, moving on an adjacent track entered the track space of a commuter train.

The first two train collisions mentioned above happened on single train-track two way traffic areas, despite both railways deploying high-tech train braking systems to prevent such collisions.

CN1325805 addresses the problem of calculating the separation distances of trains on a track. The problem addressed by CN1325805 is to detect the present on the same track of two trains travelling in opposite directions, i.e. travelling towards each other, to enable emergency braking systems to be activated to avoid a head-on collision. To achieve this, each train is provided with a single transponder which emits a track-related or track-specific frequency. The purpose therefore is to enable any train receiving the track-specific frequency to determine if the track identified by the track-specific frequency is the same track as it itself is travelling on which warns of a potential collision. However, CN1325805 does not include calculating actual distances between trains and does not suggest enabling any transponder on any train to respond with a reply signal when it receives a transponder signal from another train.

CN102756747 discloses a system which uses sound wave technology to calculate a target train distance. A first train sends out a radio signal and a sound wave. A target train (second train) receives the radio signal and starts counting the time lapse to receiving the sound wave sent from the first train. On receiving the sound wave sent from the first train, the time lapse counter stops and the elapsed time value is used with the speed of sound to determine the distance between the two trains.

CN1124858 discloses an on-board radio device which transmits its own identification code, own position (assumed to be latitude and longitude), speed, heading and track to other receivers. An on-board receiver receiving the above data plots the position on a computer display.

JP2011010515 discloses a radio communication device which performs radio communication between both trains, and a movement blocking controller on which a relative movement safety system is mounted. To always keep a critical stop point of the following train in front of that of the preceding train, the preceding train transmits its own critical stop point to the following train. On receipt of the critical stop point, the movement blocking controller of the following train generates a speed limit pattern for its own train based on the critical stop point received. Otherwise, the preceding train unilaterally generates a speed limit pattern for the following train based on its own critical stop point or a speed limit command, and transmits it to the following train.

CN103171596 discloses a safety system for a train which depends on the travelling direction. On a same travelling direction, a second train will continuously transmit a "Forward Characteristic" pulse string and wait for the first train to send back a "Backward Characteristic" pulse string. A separation distance is determined from the total time between these two pulse strings multiplied by the radio wave speed and divided by two. The system is designed for head to tail train collisions as the system uses the same frequency for trains travelling in the same direction. It cannot detect trains travelling in opposite directions, i.e. head to head, on the same track as both trains' systems operate in different frequencies.

There is a need for a system to provide train drivers with at least a traffic situation display with alerts and warnings to allow drivers to make local decisions to prevent collisions, especially head-on collisions.

Objects of the Invention

An object of the invention is to mitigate or obviate to some degree one or more problems associated with known vehicle collision safety systems.

The above object is met by the combination of features of the main claims; the sub-claims disclose further advantageous embodiments of the invention.

Another object of the invention is to mitigate or obviate to some degree one or more problems associated with known train safety systems.

Another object of the invention is to provide a stand-alone local train traffic display system for train drivers with alerts and/or warnings to enable local action by the train drivers to prevent collisions.

One skilled in the art will derive from the following description other objects of the invention. Therefore, the foregoing statements of object are not exhaustive and serve merely to illustrate some of the many objects of the present invention.

SUMMARY OF THE INVENTION

The invention provides a Train Traffic Situation Display System (TTSDS) comprising a network of radio frequency transponders (data transmitters and receivers) installed on vehicles such as trains, although the transponder systems of the invention could be employed on other vehicles such automobiles and trams. Each train preferably has two transponder systems, one at a forward part of the train and one at a rearward part of the train. Data from the forward and rearward transponder systems is fed to a display preferably provided in the train driver's cab for displaying real time train traffic situations with reference to the train's present location, i.e. position on the train track. Based on detected target train distances, the system provides advisory alerts and possible collision warnings when a preset minimum train separation limit is breached by a following train or a forward train. The alert to the train driver may be in the form of flashing lights, audio and voice announcements. Real time train status and controls are exchanged between detected transponder systems on the trains during target detection to resolve conflicts in case of a possible collision.

The system is based on radio technology using search-address mode transponders, namely each transponder has a unique address. The transponder target detection and target distance calculation is carried out by measuring the round trip time of a search pulse string transmitted to an intended target search address code of a target transponder and receiving a valid reply pulse string from the target transponder having the same address code as the search address code. Subtracting the processing time from the signal round trip time, dividing by two and multiplying the result by the speed of radio waves provides the distance to the target transponder and thus the distance to the nearest end of the target train on which the transponder is mounted.

The transponder system is a 'plug-and-play' design which requires no track side sensor input for target detection and no external system data. It can be used as a stand-alone backup system to existing train safety systems for collision pre-warning and general traffic situation display systems for train drivers and operators. It can assist drivers and operators in preventing head-to-head collisions, especially on single-track two way traffic areas, and head-to-tail collisions on the same types of track.

The transponder system uses radio wave propagation techniques to detect targets such as nearby trains at distances up to 5-10 Km or more away and will thus give ample time for the drivers of both trains to react to a critical situation such as, for example, both trains occupying the same track and travelling towards each other.

In a first main aspect, the invention provides a method of determining a separation distance between a first object and a second object where each of the first and second objects has a respective transponder with a respective unique address. The method includes the step of: transmitting a search signal on a first frequency from the transponder of the first object, said search signal including the address of the transponder of the first object and the address of the transponder of the second object. The method involves receiving the search signal transmitted by the transponder of the first object at the transponder of the second object and processing said received search signal at the transponder of the second object to locally validate the address included in said received search signal for the transponder of the second object. If the validation is positive; the method includes transmitting a reply signal on a second, different frequency from the transponder of the second object, said reply signal including the address of the transponder of the second object and the address of the transponder of the first object. The reply signal transmitted by the transponder of the second object is received at the transponder of the first object which processes said received reply signal. The method may include the step at the transponder of the first object of locally validating the address included in said received reply signal for the transponder of the second object. In any event, the transponder of the first object determines a separation distance between the first object and the second object based on a time taken from transmission of the search signal to receipt of the reply signal at said transponder of the first object.

In a second main aspect, the invention provides a system for determining a separation distance between a first object and a second object, the system comprising: a search module associated with a first object, said search module comprising a first transponder having a unique address; a reply module associated with a second object, said reply module comprising a second transponder having a different, unique address; the search module being configured to transmit a search signal on a first frequency, said search signal including the address of the first transponder and the address of the second transponder; the reply module being configured to receive the search signal and locally validate the address included in said received search signal for the second transponder, whereby, if the validation is positive; the reply module transmits a reply signal on a second, different frequency, said reply signal including the address of the second transponder and the address of the first transponder; the search module being configured to receive the reply signal and to locally validate the address included in said received reply signal for the second transponder whereby, if the validation is positive, the search module determines a separation distance between the first object and the second object based on a time taken from transmission of the search signal to receipt of the reply signal at said search module.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
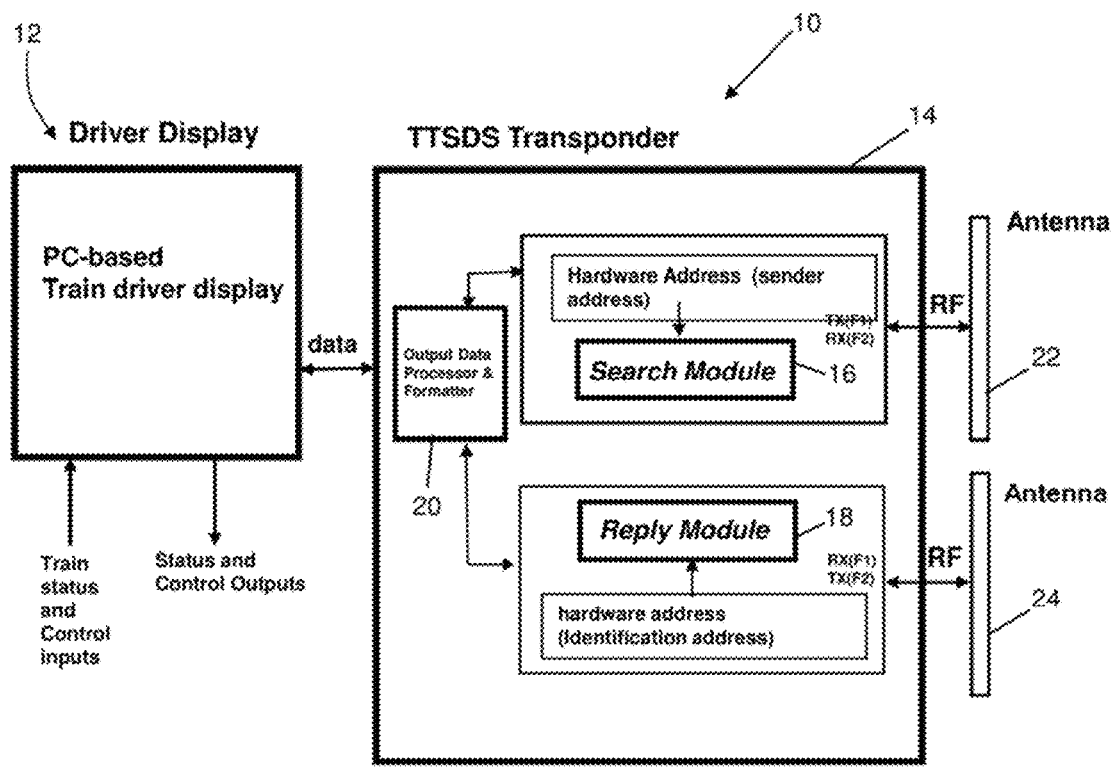
FIG. 1 is a simplified block schematic diagram of a transponder system according to the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGS, may be implemented in various forms of hardware, software or combinations thereof. Preferably, these elements are implemented in a combination of hardware and software on one or more appropriately programmed general-purpose devices, which may include a processor, memory and input/output interfaces.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

The following description of preferred embodiments of the invention is made with respect to trains operating on a railway system, but it should be understood that the embodiments and methods described herein could be applied to any type of movable vehicle.

Referring to the drawings, FIG. 1 shows a transponder system 10 in accordance with a first embodiment. The transponder system 10 comprises a driver display module 12 connected to a transponder unit 14. The transponder unit 14 comprises a search module 16 and a reply module 18, both of which are under control of a processor system 20. The processor system 20 includes memory for storing machine code executable to implement the functions of the transponder system 10. The processor system 20 may include a clock generator, target range counters and some miscellaneous circuits. The transponder unit 14 has a unique identifier or address allocated to it which is used by the reply module 18 for validating a search signal received at the reply module 18 from a search module of another transponder system. The search module 16 may have a different unique address allocated to it which is used by the search module 16 to validate a reply signal received at the search module 16 from a reply module of another transponder system and for detection control. The allocated addresses are unique among a set of addresses allocated to transponder systems respectively associated with a set of trains operating on a railway system. It will be understood therefore that the addresses may not be universally unique, but merely need to be unique within the system in which they are allocated.

Each of the search module 16 and the reply module 18 comprise wireless, i.e. radio, transceivers enabling each module 16, 18 to both send and receive signals. Each of the search module 16 and the reply module 18 has a respective directional antenna 22, 24. The antennas 22, 24 are preferably narrow beam directional antennas designed for line of sight communication, but in some applications omnidirectional antennas could be deployed.

Whilst it is possible to configure the transponder system 10 as a single transponder system for a train, it is preferred to provide one transponder system 10 at a forward position on a train and one transponder system 10 at a rearward position on a train. Consequently, the forward transponder system 10 is utilized to determine a traffic situation forward of the train whilst the rearward transponder system 10 is utilized to determine a traffic situation rearward of the train. To avoid unintentional corruption of signals, the forward transponder system 10 and the rearward transponder system 10 use different, unique addresses. As such, the train has associated with it two unique addresses.

The driver display module 12 is preferably a personal computer (PC) based system. The driver display module 12 is configured to receive data from the or both transponder systems 10 and to display to a driver an image of the traffic situation for the train. In other words, whilst a separate driver display module could be provided for each of the forward and rearward transponder systems, it is preferred that data from both transponder systems on the train are fed to the driver display module 12, but the train may be provided with a driver display module in both the forward and rearward driving cabs of the train. Each such driver display module may be connected to both of the transponder systems.

The transponder system 10 may be portable and powered by its own power supply. As such, the unique addresses assigned to the transponder system 10 are not necessarily train specific, i.e. are not necessarily linked to an identity of a train on which a transponder system is deployed.

Figure 2:
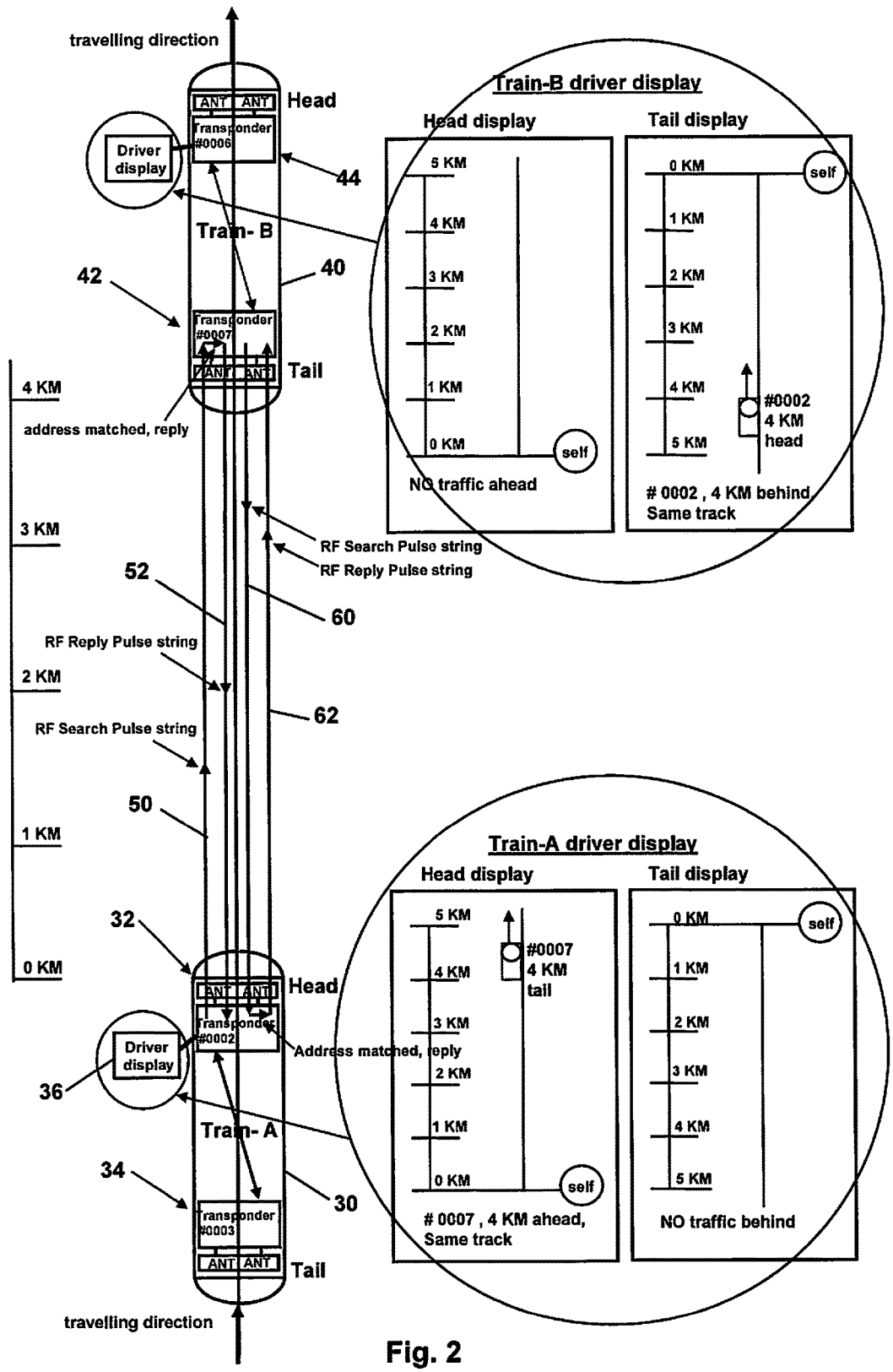
FIG. 2 is an illustration of a first scenario in which the transponder system of the invention can be used.

FIG. 2 illustrates a first train "Train-A" 30 travelling on a same railway track as a second train "Train-B" 40 and shows the signals communicated between the forward transponder system 32 of Train-A 30 and the rearward transponder system 42 of Train-B 40. In this example, the forward transponder system 32 of Train-A 30 is allocated the unique identifier or address "#0002" and the rearward transponder system 42 of Train-B 40 is allocated the unique identifier or address "#0007". In a first step, the search module of the forward transponder system 32 of Train-A 30 transmits a search signal (RF search pulse string) 50 in a forward direction of travel of Train-A 30. Search signal 50 is received at the reply module of rearward transponder system 42 of Train-B 40. The reply module processes the search signal 50 to determine if a transponder address #0007 carried in a reply transponder field of the search pulse string comprising search signal 50 matches the unique address #0007 allocated to the rearward transponder system 42 of Train-B 40. If the reply module of the rearward transponder system 42 of Train-B 40 determines no match then the validation fails and the reply module 'assumes' the search signal 50 is not intended for it. In a preferred embodiment, the reply module of the rearward transponder system 42 of Train-B 40 will not issue any reply signal in response to a false validation, although, in some embodiments, the reply module may be configured to issue a 'null' reply signal which at least identifies to the forward transponder system 32 of Train-A 30 of the presence of Train-B 40 within radio propagation distance of Train-A 30.

In the event that the validation of the transponder address #0007 carried in the reply transponder field of the search pulse string is positive, i.e. the reply module of rearward transponder system 42 of Train-B 40 validates that the search signal 50 is intended for it, the reply module transits a reply signal 52 which preferably at least carries the unique address #0007 of the rearward transponder system 42. In any event, once the reply signal is received by the search module of the forward transponder system 32 of Train-A 30, the transponder system 32 processes said received reply signal in order to determine a separation distance between Train-A 30 and Train-B 40 based on a time taken from transmission of the search signal 50 to receipt of the reply signal 52 at said forward transponder system 32 of Train-A 30. The determination of the separation distance may take into account other factors such as the processing signal time and the position of the transponder unit relative to its end of the train if it is not actually positioned at the end of the train.

The reply signal 52 is preferably transmitted on a different frequency to that used for the search signal 50.

In the foregoing example, the transponder system 42 of Train-B 40 is referred to as the "rearward" transponder system 42 of Train-B 40. It will, however, be understood that said transponder system 42 of Train-B 40 might comprise its forward transponder system in the situation where Train-B 40 is, in fact, travelling towards Train-A 30. Consequently, in preferred embodiments, both the search signal 50 and the reply signal 52 may carry other data defining, for example, any one or more of the train status (emergency stopped due to mechanical problems, communication failure, normal stop at station platform, moving, direction of travel, speed), the identity of the track the train is on, position of the transponder (forward or rearward of its train), the type of train, etc. This information can be obtained locally by the respective transponder systems of the trains such that the transponder systems can operate in stand-alone modes without requiring data from external or centrally controlled systems.

In the foregoing example, it is preferred that the "rearward" transponder system 42 of Train-B 40 is configured to include at least its own address #0007 in the reply signal 52, but preferably also the address #0002 of the forward transponder system 32 of Train-A 30. Consequently, once the reply signal 52 is received at the forward transponder system 32, the forward transponder system 32 processes the reply signal 52 to at least locally validate the address #0007 of the "rearward" transponder system 42 and preferably also to validate its own address #0002. Validation of the addresses is performed by comparing locally stored addresses with addresses retrieved from the respective search or reply signals 50, 52. Local validation of addresses has the benefit of ensuring that transponder systems process only those signals intended for them and thus avoid or at least reduce signal processing errors.

In the foregoing example, it will be understood that a search module of the "rearward" transponder system 42 of Train-B 40 is configured to also transmit a search signal 60 and that a reply module of the forward transponder system 32 of Train-A 30 is configured to process said search signal 60 and, if local validation is positive, to transmit a reply signal 62. Similarly, search and reply modules of a rearward transponder system 34 of Train-A 30 are configured operate in a rearward direction of Train-A 30 using the same methodology as herein described. This is also the case for search and reply modules of a forward transponder system 44 of Train-B 40. Consequently, all trains are provisioned with transponders systems which enable them to develop forward and rearward traffic situation displays.

Data from the forward and rearward transponder systems 32, 34 of Train-A 30 can be provided to the driver display system 36 to thereby display to the driver the determined distance to Train-B 40 and to any other detected trains. The transponder systems may be configured to issue an alert or a warning to a driver when a predetermined minimum 'safety' distance with another train or at least another transponder system is breached which may warn of a potential collision. In issuing such an alert or warning, the transponder system may take into account other data such as train track data whereby a collision warning is not necessary if an on-coming train is known to be on a separate track. In the example of FIG. 2, it can be seen that the driver of Train-A 30 has display data showing the separation distance of Train-B 40, but that there appears to be no train detected within radio propagation distance behind Train-A 30. For the driver of Train-B 40, it can be seen that the display data shows the separation distance of Train-A 30 behind Train B 40, but that there appears to be no train detected within radio propagation distance in advance of Train-B 40. It will be understood, however, that the system of the invention is not intended to replace existing safety systems, but to provide a back-up stand-alone system which a driver may use should other safety systems fail or at least fail to show the presence of other trains nearby.

It is preferred that the transponder system is configured to periodically send search signals to detect other trains. This may be achieved by the transponder system sending search signals in a sequential basis working in turn through a list of known transponder addresses for other transponder systems associated with other trains and then waiting to receive reply signals. The use of the double addressing scheme described herein enables the generation of search signals in a polling methodology whereby other transponder systems are configured to only transmit a reply signal once they have validated their own address within a received search signal. In turn, the transponder systems are configured to include at least their own address in the reply signal. The use of double addressing is beneficial in that it reduces corruption of reply pulse strings caused by receiving multiple replies from close range targets at the same time.

Whilst the foregoing example is described with respect to two trains, it will be understood that the system could be employed where one of the objects is not movable. For example, where a maintenance team is working on a railway, it is current practice to post human operatives at some distances in either direction from the maintenance team to manually alert the team when a train is approaching. In the present invention, a maintenance team could be provisioned with one or more portable transponder systems as herein described whereby a stationary transponder system of the maintenance team could communicate with the transponders systems of trains to alert both the maintenance team and the train drivers of the presence of each other and, in particular, to warn the maintenance team of incoming train traffic.

Figure 3:
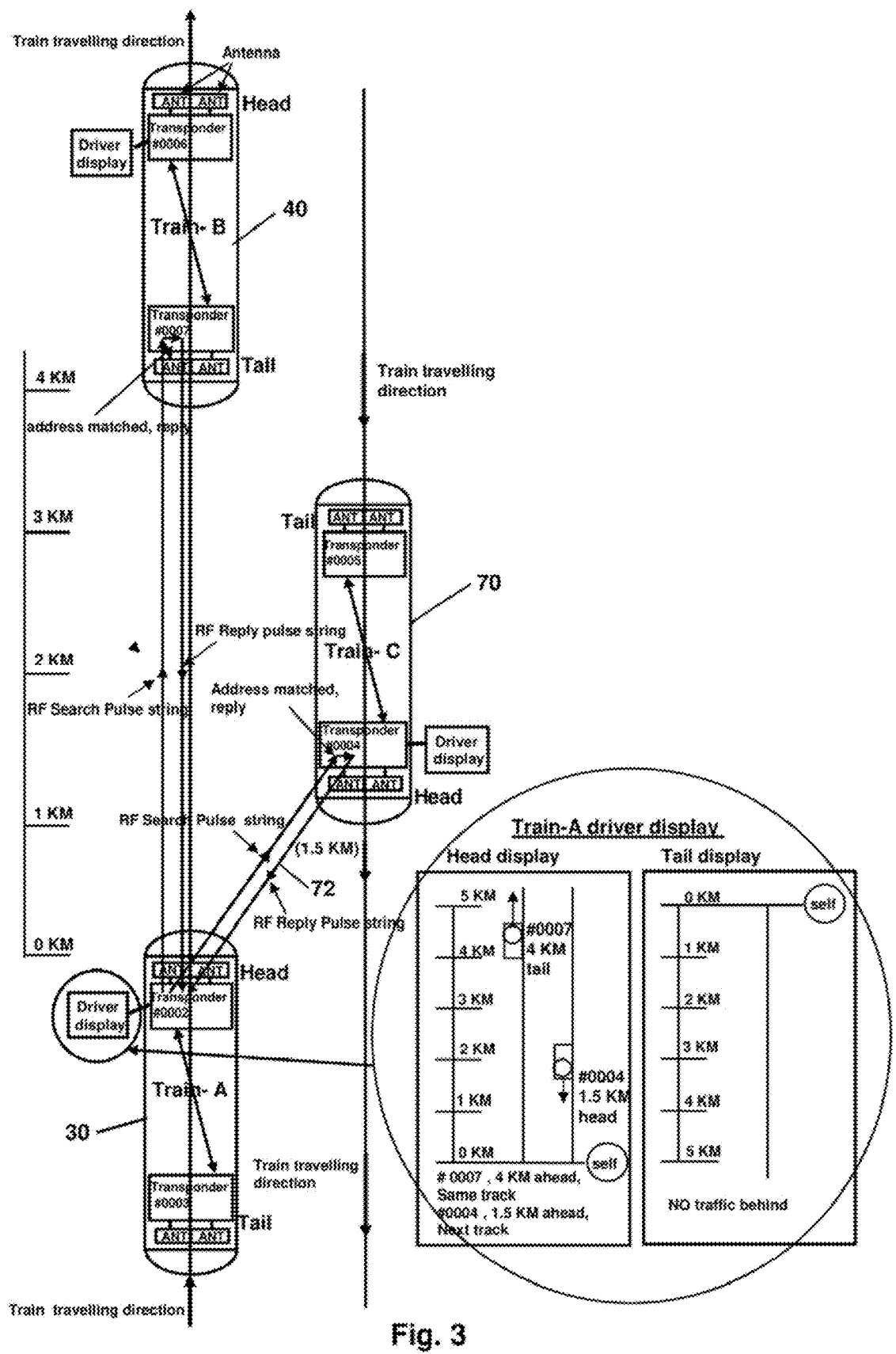
FIG. 3 is an illustration of a second scenario in which the transponder system of the invention can be used.

FIG. 3 shows a similar scenario to FIG. 2 save for the presence of a third train, Train-C 70 on an adjacent track. The methodology described with respect to FIG. 2 applies to FIG. 3 where the display of Train-A 30 will show to its driver the separation distance to Train-B 40 and the separation distance to Train-C 70, but also that Train-B 40 is moving in the same direction as Train-A 30, whereas Train-C 70 is moving towards Train-A 30. However, the use of other data in the reply signal 72 from Train-C 70 to Train-A 30 may be used to determine that Train-C 70 is on a different track to that of Train-A 30 and thus there is no danger of collision.

Figure 4:
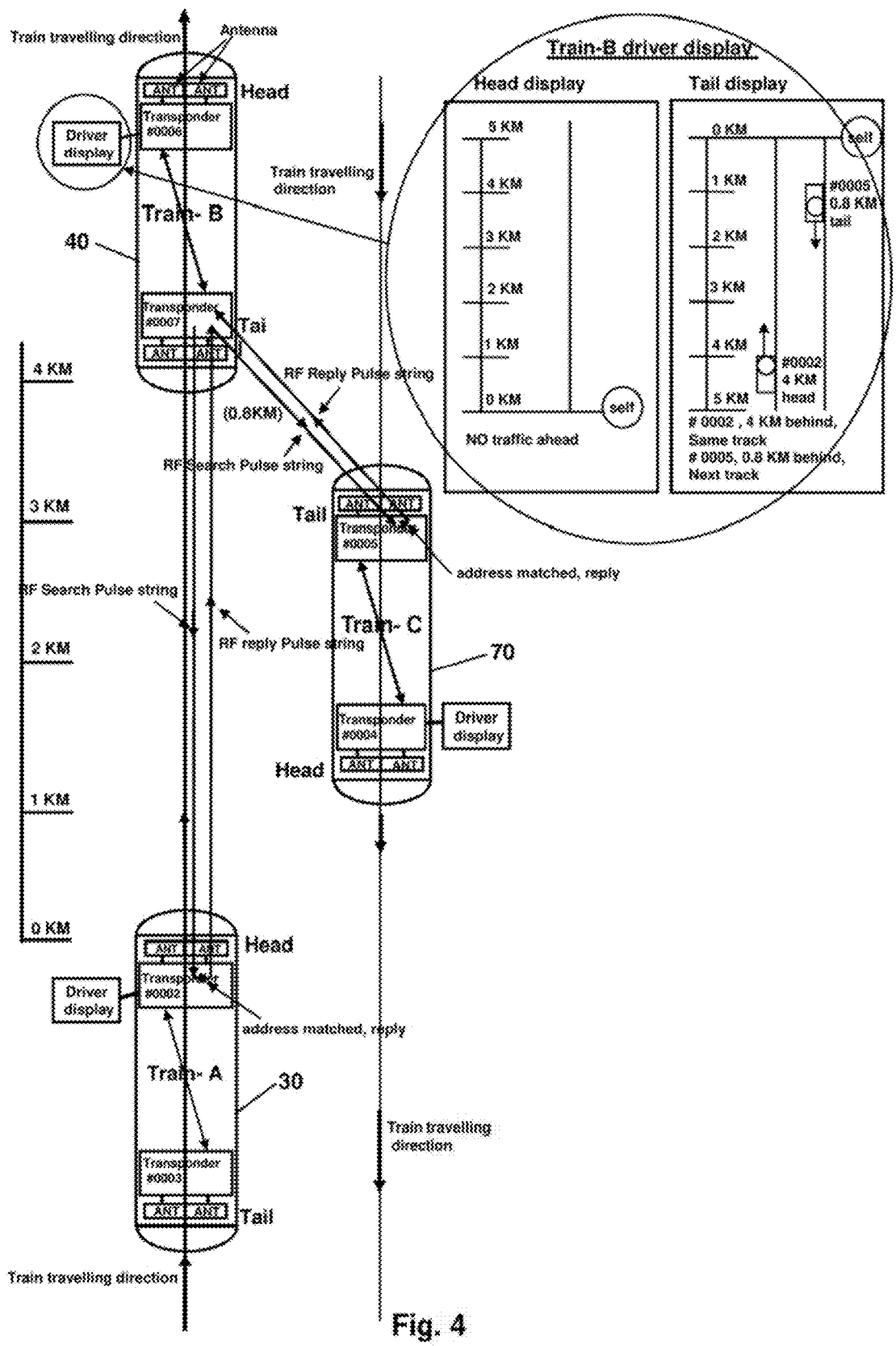
FIG. 4 is an illustration of a third scenario in which the transponder system of the invention can be used.

FIG. 4 shows the same scenario as FIG. 3, but from the position of the driver of Train-B 40. In this case, the rearward transponder system 42 of Train-B 40 informs the driver of the separation distance with Train-A 30 and that it is moving in the same direction and possibly on the same track as Train-B 40, but that Train-C 70 is moving away from Train-B 40 on a different track.

Figure 5:
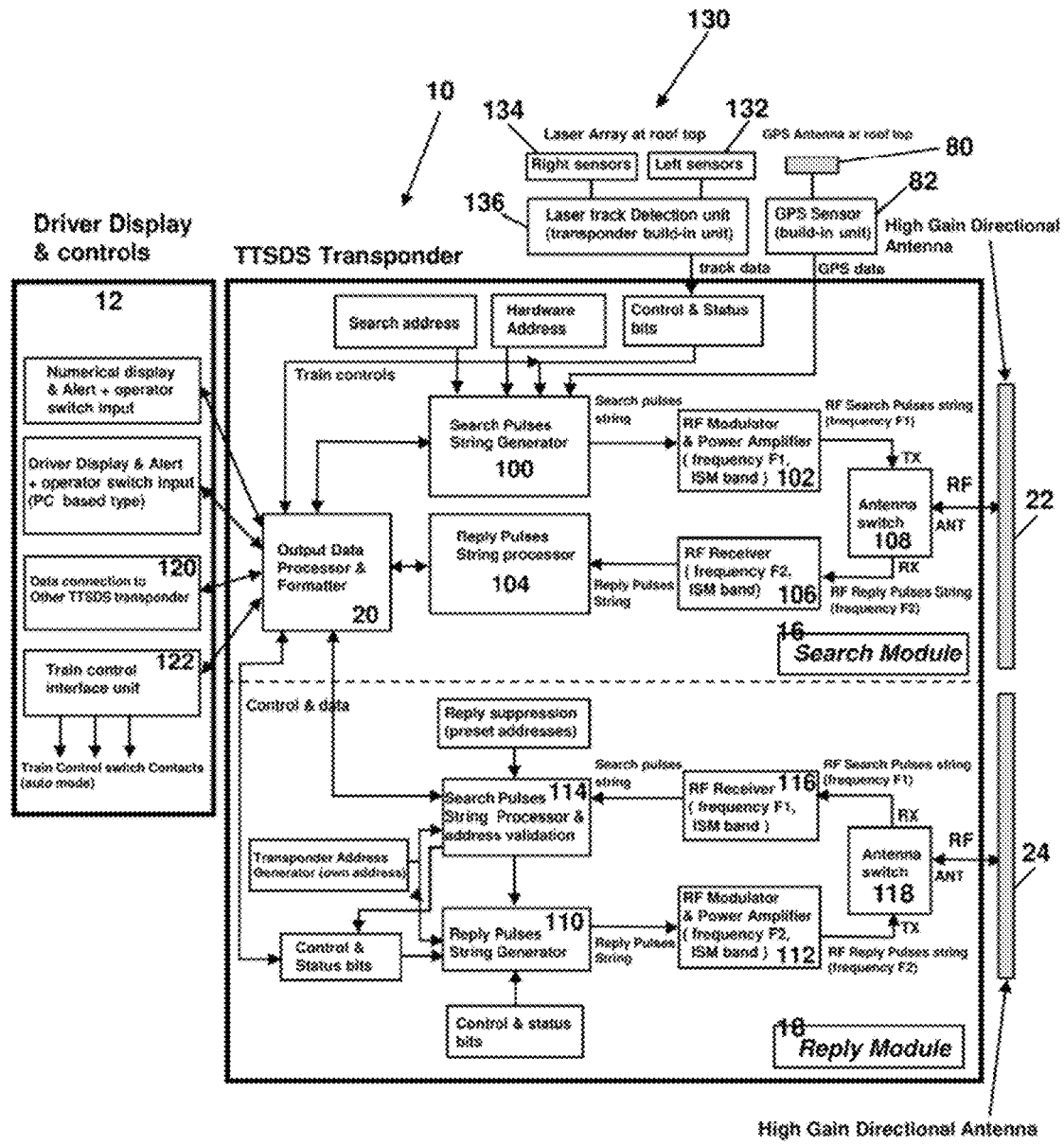
FIG. 5 is a more detailed block schematic diagram of the transponder system of FIG. 1.

FIG. 5 is a more detailed view of the transponder system 10 of FIG. 1. It can be seen that the transponder system 10 may be connected to external systems to receive data. For example, the transponder system 10 may include a global positioning system (GPS) antenna 80 and sensor 82 to receive GPS position data. GPS data is included as as auxiliary input to enhance range accuracy up to few meters. However, it will be understood that, in the absence of a GPS signal, the transponder system 10 can continue to operate as intended in a stand-alone manner. It can also be seen that the search module 16 comprises a search pulse string generator 100 with a RF modulator 102 to modulate a search pulse string comprising a search signal at a first frequency F1. The search module 16 also includes a reply pulse string processor 104 and associated RF receiver 106 for demodulating a received reply signal on a second, different frequency F2. An antenna switch 108 enables switching between the frequencies F1 and F2 for the high gain, directional antenna 22.

For the reply module 18, there is provided a reply pulse string generator 110 with a RF modulator 112 to modulate a reply signal on the second frequency F2. A search pulse string processor 114 is provided to process received search signals from other transponder systems and has an associated demodulator 116 for demodulating a received search signal on the first frequency F1. An antenna switch 118 enables switching between the frequencies F1 and F2 for the high gain, directional antenna 24.

The driver display system 12 may include a data connection 120 to other transponder systems and a train control interface unit 122.

In addition to the foregoing modules of the transponder system, there may be provided a track detection system 130 for detecting the existence of one or more adjacent tracks to that on which the train is travelling. The track detection unit 130 may comprise a laser track detection unit comprising sets of left and right laser sensors 132, 134 carried on the train. The sets of sensors 132, 134 are connected to a track detection unit 136 which communicates with the main processor 20 of the transponder system 10.

Figure 6:
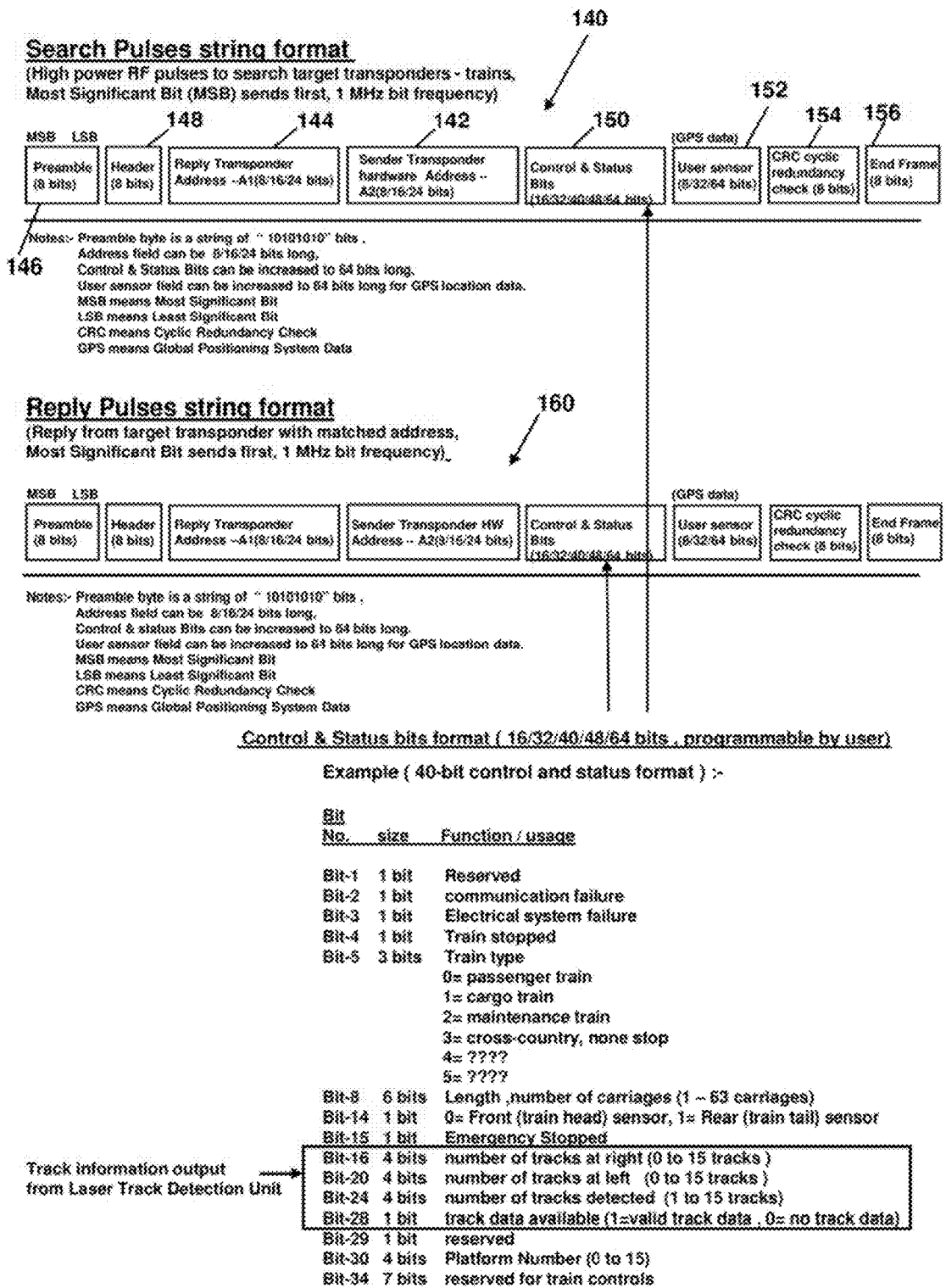
FIG. 6 illustrates the formats of search pulse strings and reply pulse strings in accordance with the invention.

FIG. 6 illustrates preferred search signal pulse strings 140 and preferred reply signal pulse strings 160. The search signal pulse string 140 includes at least a sender transponder address field 142 and a reply transponder address field 144, i.e. the address of the transponder to which a search signal is addressed. In addition, the search signal pulse string 140 may include a preamble field 146, a header 148, control and status bits 150, sensor bits 152, Cyclic Redundancy Check (CRC) byte 154 and an end frame 156. The reply signal pulse string has a same format. The control and status bits 150 may include track information output from the track detection unit.

Figure 7:
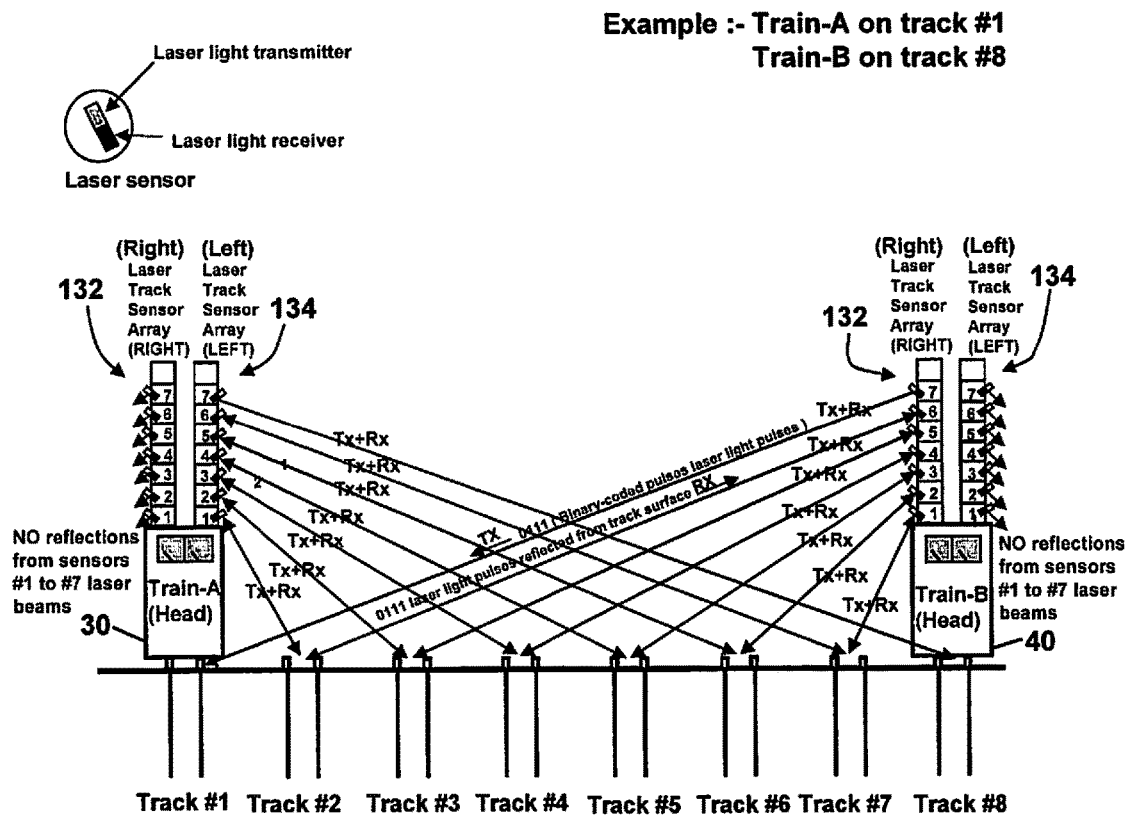
FIG. 7 illustrates use of an enhanced transponder system in accordance with the invention.
Figure 7:
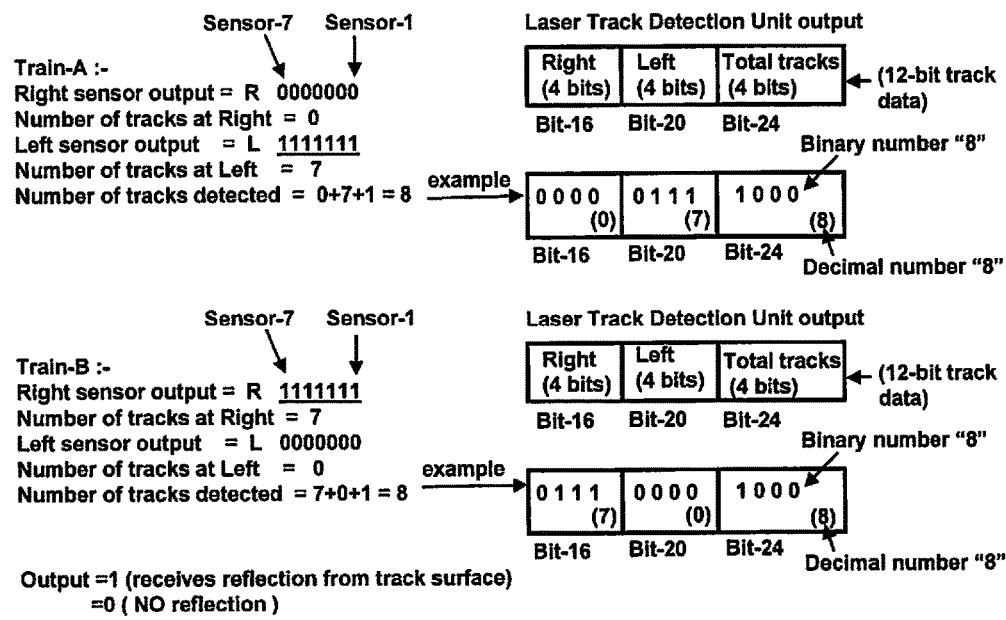
Figure 8:
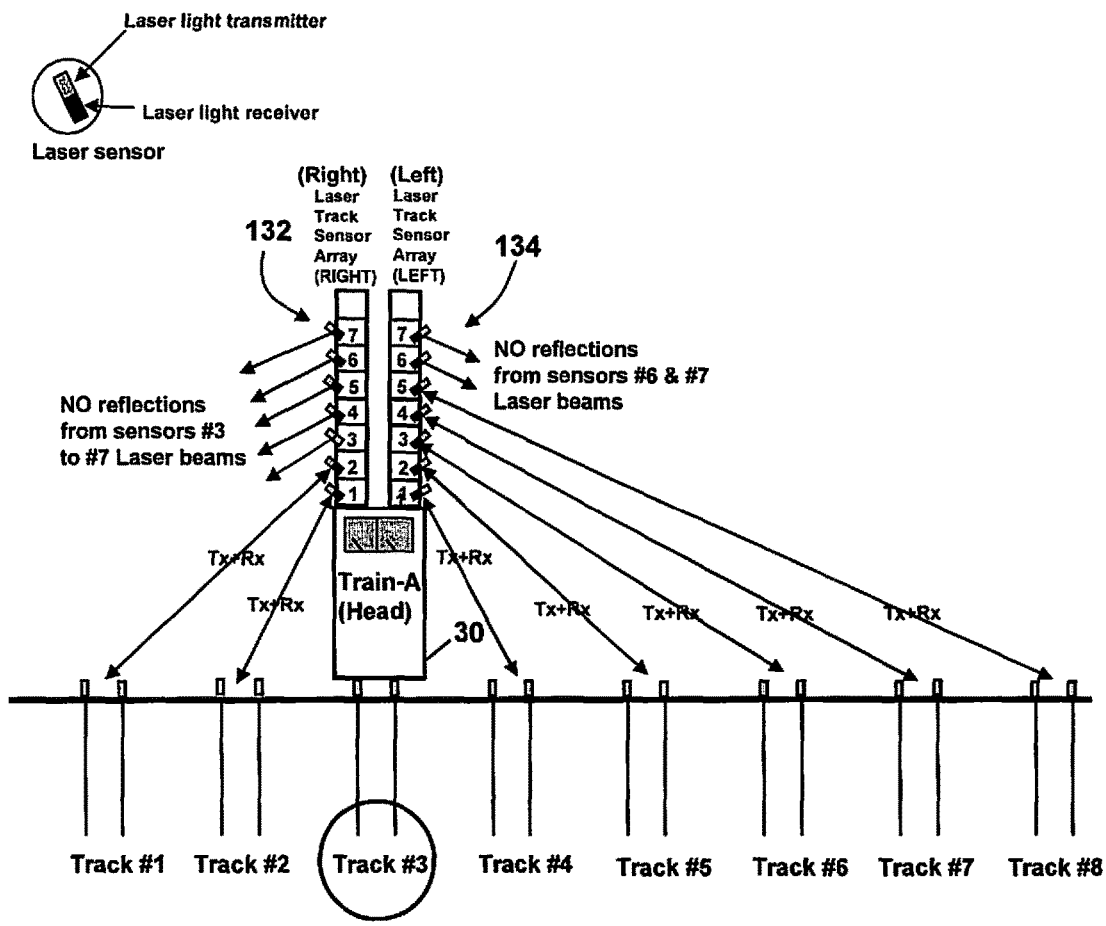
FIG. 8 also illustrates use of an enhanced transponder system in accordance with the invention.

FIGS. 7 and 8 illustrate two scenarios where one or more trains are using a track detector unit to identify the existence of adjacent train tracks. The sets of sensors 132, 134 carried on the trains are arranged to sense reflections of laser light emitted at different predetermined angles from the sides of the train. The number of sensors in each set 132, 134 may be selected as the maximum number of anticipated tracks at any point in the railway system, although the number of sensors provided may be more limited than that and configured to detect the nearest few adjacent tracks. In FIG. 7, it can be seen that Train-A 30 is on a rightmost track such that its right set of sensors 132 receive no reflections indicating the absence of any tracks to the right of Train-A 30. In contrast, the left set of sensors 134 for Train-A 30 receive reflections from seven tracks enabling the transponder system 10 of Train-A 30 to determine that there are in total eight tracks comprising the seven detected tracks and the track on which Train-A 30 is running. In a similar, but reverse manner, Train-B 40 also determines that there are eight tracks by sensing on its right side seven tracks, no tracks on its left side, and taking into account the track it is running on.

In FIG. 8, Train-A 30 is running on track 3 and thus detects reflections from two tracks to its right and five tracks to its left.

Figure 9:
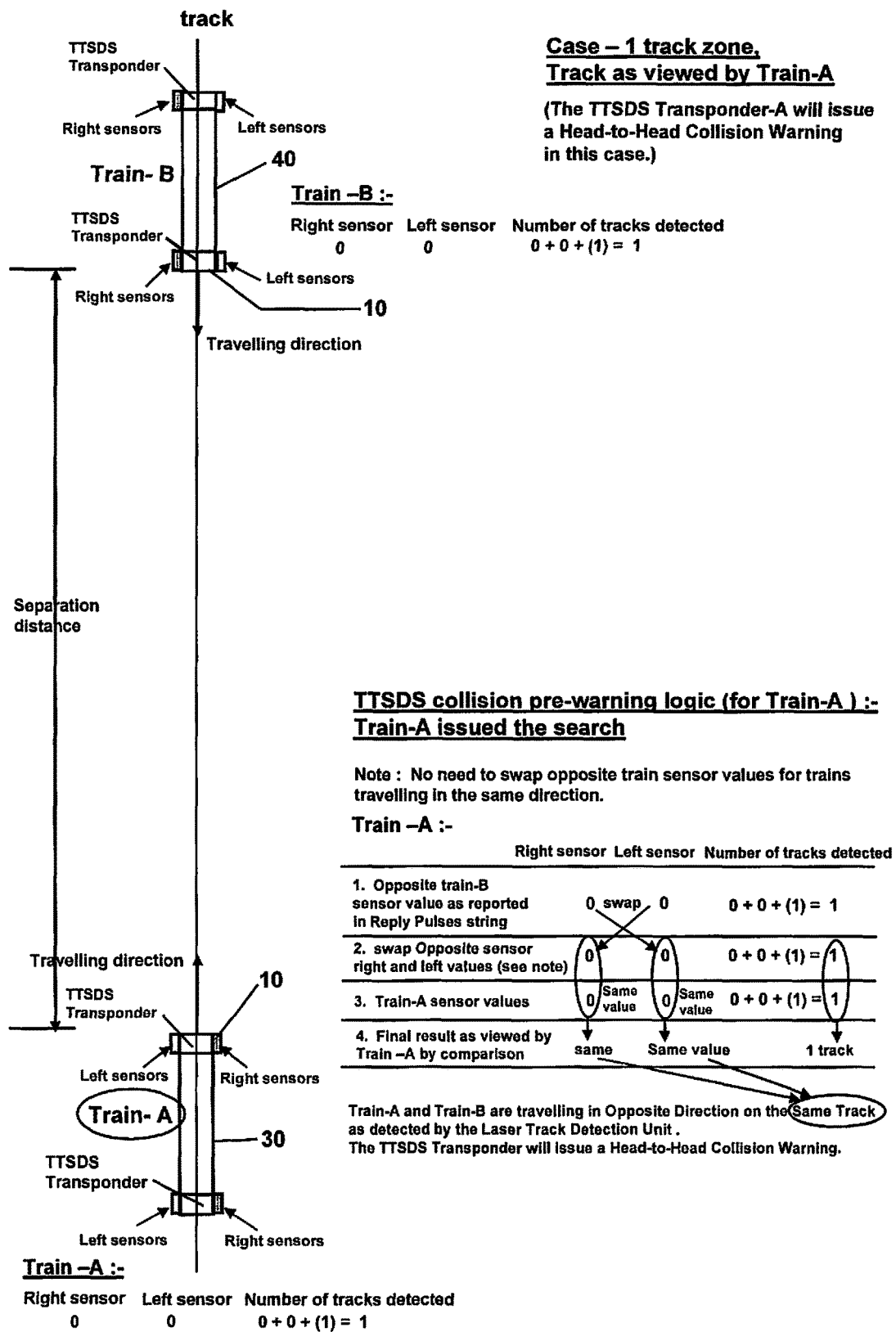
FIG. 9 is an illustration of a first scenario in which the enhanced transponder system of the invention can be used.

FIG. 9 illustrates a similar situation as in FIG. 2, but where Train-A 30 and Train-B 40 are both configured with track detection systems. In FIG. 2, it was assumed that the transponder systems 10 of the trains were receiving track information from an external source or some other source such as a stored map of the railway network, but this information may not be available or be lost if other train safety systems suffer a failure. Consequently, the transponder system 10 used in the scenario of FIG. 9 has been enhanced with a track detection system so that the transponder system can locally determine the number of tracks to its right and its left and thus to locally determine which track its train is running on. The track identity information can be included in the search and reply signals between transponder systems in additional to other train status information such as direction of travel, etc. In FIG. 9, the transponder systems 10 of Train-A 30 and Train-B 40 are able to inform each other that the two trains are running on the same track, are running towards each other, i.e. head-on, and can determine their separation distance. Thus, the transponder systems 10 are able to alert their respective driver to a potential head-on collision so that the drivers may take preventive action such as stopping their trains.

Figure 10:
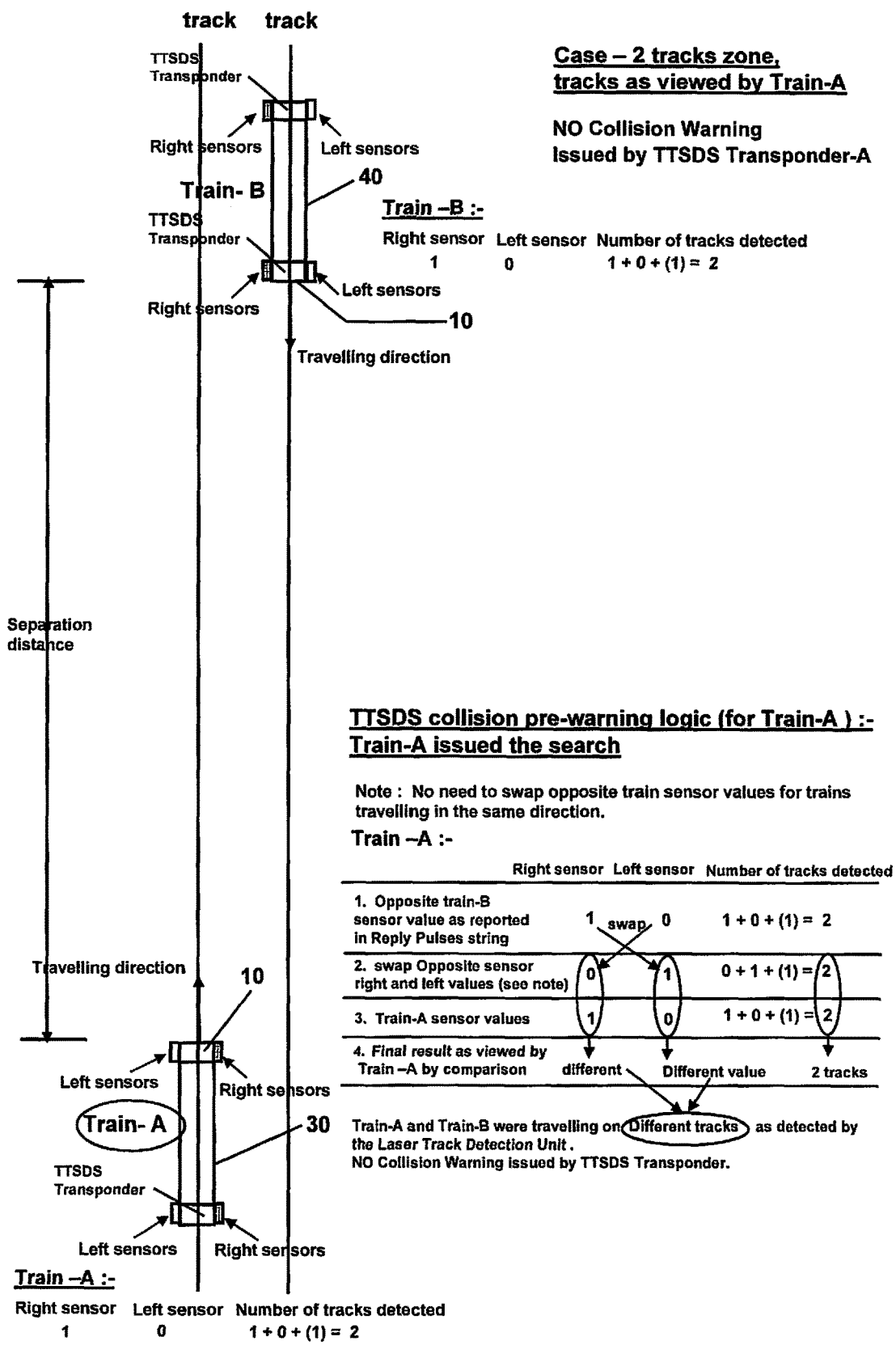
FIG. 10 is an illustration of a second scenario in which the enhanced transponder system of the invention can be used.

In FIG. 10, the enhanced transponder systems 10 for Train-A 30 and Train-B 40 are able to determine that their respective trains are running on different tracks and thus there is no risk of a collision.

Figure 11:
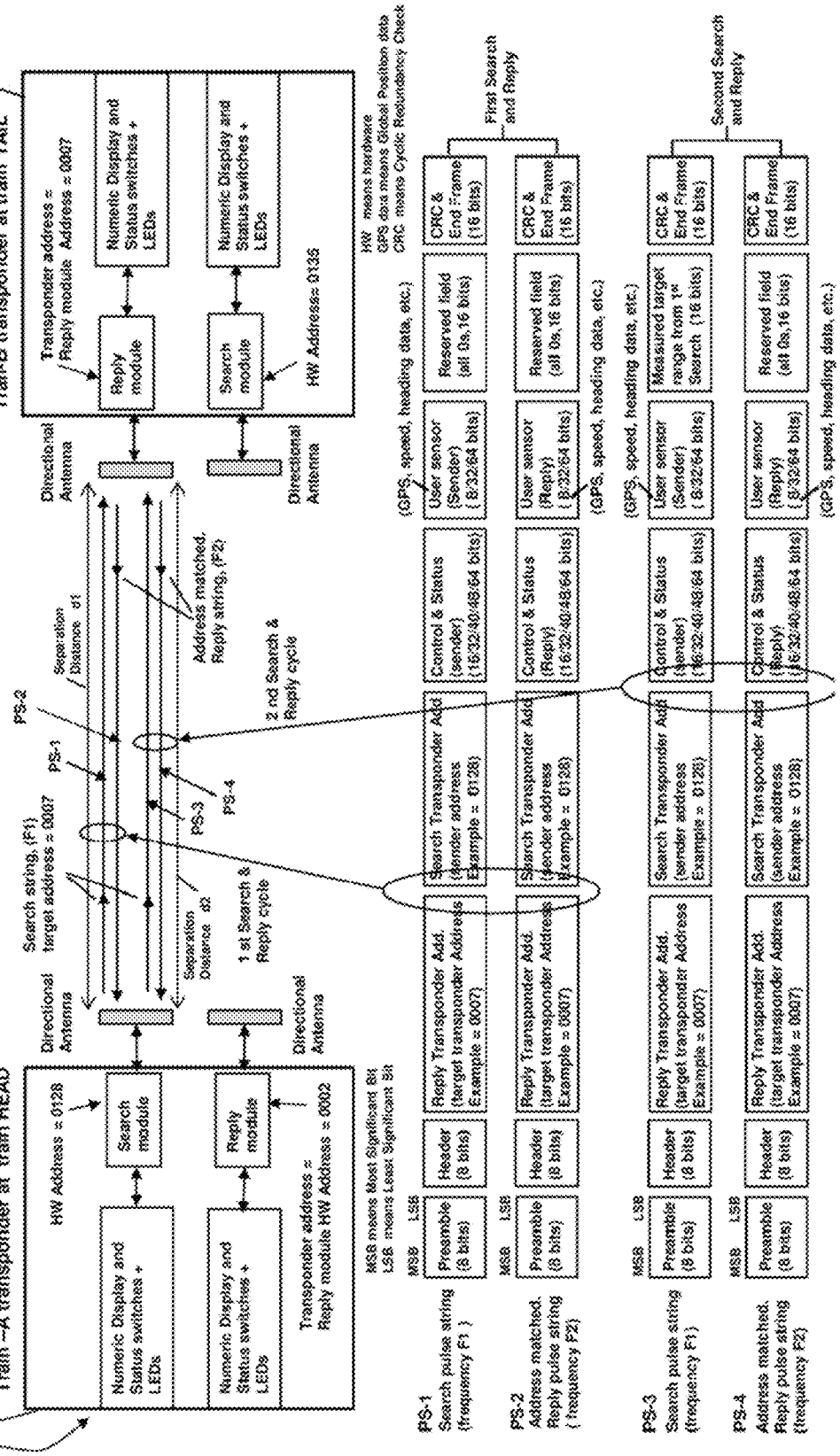
FIG. 11 illustrates a modified search signal and reply signal scheme.

Using the numerals of FIG. 2, FIG. 11 illustrates a modified search signal and reply signal scheme whereby the transponder system 32 for Train-A 30 is configured to issue two successive search pulse strings. A first search pulse string PS-1 is transmitted to a targeted reply module of another transponder system, namely the reply module of the transponder system 42 of Train-B 40 in this example. The transponder system 42 of Train-B 40 is configured to respond in the manner as hereinbefore described such that it transmits a first reply pulse string PS-2 to the transponder system 32 of Train-A 30. On receipt of the first reply pulse string PS-2, the transponder system 32 of Train-A 30 determines a first separation distance d1 between the two trains 30, 40. Within a short predetermined time period of preferably less than 2 ms from issuance of the first search pulse string PS-1, the transponder system 32 of Train-A 30 is configured to send a second search pulse string PS-3 to the reply module of the transponder system 42 of Train-B 40, where the string PS-3 preferably includes the measured target range, i.e. separation distance d1, from the first search/reply cycle. The predetermined short period is the search repetition period whereby the transponder system 32 selects a next target address from a stored list of addresses and repeats the search/reply cycle as mentioned above. The measured target range may be included in a reserved field of the string PS-3. In response to the second search pulse string PS-3, the reply module 42 of the transponder system of Train-B 40 transmits a second reply pulse string PS-4 from which the transponder system 32 of Train-A determines a second measured target range, i.e. a second separation distance d2. The transponder system 32 of Train-A may be configured to use the second separation distance d2 in place of the first separation distance d1 or to calculate an average of d1 and d2 and use the resulting average separation distance. The modified search signal and reply signal scheme of FIG. 11 is advantageous in that, should for any reason the first search pulse string PS-1 not be received by the reply module of the transponder system 42 of Train-B 40 or the reply pulse string PS-2 not be received by the transponder system 32 of Train-A 30, then the second search pulse string PS-3 may still succeed in obtaining a reply such that a separation distance between the two trains 30, 40 can be obtained. The same procedure, but in reverse, could be implemented by the search module of the transponder system 42 of Train-B 40 and the reply module of the transponder system 32 of Train-A 30.

The foregoing systems and methods may be applied to other vehicles such as, but not limited to, automobiles and trams. The system and method of the invention are particularly applicable to vehicle systems running on a pathway comprising any of: a defined pathway; a road lane; a railway track; or a tramway track.

The method of the invention may be modified whereby the search signal transmitted by a first transponder system includes time data and whereby the method includes the step, after the validation step at a second transponder system receiving the search signal, of determining from its own local time data and the time data included in the received search signal a separation distance between the two transponders systems. This calculated separation distance can be included as distance data in the reply signal such that the distance data included in the reply signal is used at the first transponder system as a distance as a distance check mechanism when it itself is determining the separation distance.

The method may further be modified by arranging a first transponder system to determine a direction of travel an object or vehicle associated with a second transponder system from a rate of change of distances determined from successive reply signals.

In general, the invention provides a method and system for determining a separation distance between a first object and a second object. It is envisaged that at least one of the objects is a movable vehicle such as a train. The method comprises using a search module associated with a first object where said search module comprises a first transponder having a unique address. The method includes using a reply module associated with a second object where said reply module comprises a second transponder having a different, unique address. The method includes the search module transmitting a search signal on a first frequency, said search signal including the address of the first transponder and the address of the second transponder. The reply module receives the search signal and locally validates the address included in said received search signal for the second transponder, whereby, if the validation is positive; the reply module transmits a reply signal on a second, different frequency, said reply signal including the address of the second transponder and the address of the first transponder. The search module receives the reply signal and locally validates the address included in said received reply signal for the second transponder whereby, if the validation is positive, the search module determines a separation distance between the first object and the second object based on a time taken from transmission of the search signal to receipt of the reply signal at said search module. The local validation of the address of the second transponder at the reply module and then at the search module improves reliability of processing of reply signals and allows the method to be implemented in a stand-alone configuration not reliant on signals from external systems While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of determining a separation distance between a first object and a second object where each of the first and second objects has a respective transponder with a respective unique address, the method comprising the steps of:
   transmitting a search signal on a first frequency from the transponder of the first object, said search signal including the address of the transponder of the first object and the address of the transponder of the second object;
   receiving the search signal transmitted by the transponder of the first object at the transponder of the second object;
   processing said received search signal at the transponder of the second object to locally validate the address included in said received search signal for the transponder of the second object and, if the validation is positive;

transmitting a reply signal on a second, different frequency from the transponder of the second object;

receiving the reply signal transmitted by the transponder of the second object at the transponder of the first object;

processing said received reply signal at the transponder of the first object to determine the separation distance between the first object and the second object based on a time taken from transmission of the search signal to receipt of the reply signal at said transponder of the first object; and wherein the transponder of the first object sends two successive search signals, each of said successive search signals being transmitted in a respective predetermined search repetition period and repeating the process for a next target address.

2. The method of claim 1, wherein the step of transmitting the reply signal on the second, different frequency from the transponder of the second object comprises including at least the address of the transponder of the second object in said reply signal; and, once said reply signal is received at the transponder of the first object, the method further comprising the steps of:

processing said received reply signal at the transponder of the first object to locally validate the address included in said received reply signal for the transponder of the second object and, if the validation is positive;

determining said separation distance between the first object and the second object.

3. The method of claim 2, wherein the step of transmitting the reply signal on the second, different frequency from the transponder of the second object comprises including the address of the transponder of the first object in said reply signal.

4. The method of claim 3 wherein the step of locally validating the reply signal at the transponder of the first object includes locally validating the address for the transponder of the first object included in said reply signal.

5. The method of claim 1, wherein at least one of the first object and the second object comprises a vehicle movable along a pathway comprising any of: a defined pathway; a road lane; a railway track; or a tramway track.

6. The method of claim 5, wherein the reply signal includes pathway data identifying the pathway for the vehicle of the transponder of the second object and the transponder of the first object utilizes the pathway data to determine if the first vehicle is on a same pathway as the object or vehicle of the transponder of the second object.

7. The method of claim 1, wherein, if local validation at said transponder of the second object is negative, then either transmitting a 'null' reply signal or not transmitting any reply signal from the transponder of the second object.

8. The method of claim 1, wherein the search signal includes time data and the method includes the step, after the validation step at the transponder of the second object, of determining from local time date and the time data included in the received search signal a distance of the second object from the first object.

9. The method of claim 8, wherein the distance calculated at the transponder of the second object is included as distance data in the reply signal.

10. The method of claim 9, wherein the distance data included in the reply signal is used at the transponder of the first object after the step of determining the separation distance as a distance check mechanism.

11. The method of claim 1, wherein the transponder of the first object periodically transmits search signals.

12. The method of claim 11, wherein the transponder of the first object periodically transmits search signals to a plurality of other transponders, each transponder having a unique address and being associated with a respective object or vehicle.

13. The method of claim 12, wherein the transponder of the first object can determine relative positions of the respective objects or vehicles associated with said plurality of other transponders from the reply signals issued by said other transponders.

14. The method of claim 12, wherein the transponder of the first object can determine direction of travel of an object or vehicle associated with another transponder from any of: direction of travel data included in the reply signal; and from a rate of change of distances determined from successive reply signals.

15. The method of claim 1, wherein each of the transponder of the first object and the transponder of the second object comprises a search module and a reply module such that each of the transponder of the first object and the transponder of the second object can operate in both search and reply modes for their respective objects.

16. The method of claim 1, wherein at least the first object is a train and the train is provided with two transponders, one at a forward location of the train for sending at least search signals in a direction of travel of the train and one at a rearward position of the train for sending at least search signals in a reverse direction of travel of the train.

17. The method of claim 16, wherein data from the two transponders is displayed to a train operator to provide the operator with a real time traffic situation picture in the forward and rearward directions of the train within radio coverage of said two transponders.

18. A system for determining a separation distance between a first object and a second object, the system comprising:

a search module associated with the first object, said search module comprising a transponder of the first object having a unique address;

the search module being configured to transmit a search signal on a first frequency to a second transponder associated with the second object, said second transponder having a different, unique address, said search signal including the address of the transponder of the first object and the address of the transponder of the second object, the search signal being for receipt and processing at the transponder of the second object to locally validate at least the address of the transponder of the second object included in said search signal;

the search module being configured to receive on said second, different frequency a reply signal transmitted by the transponder of the second object if the validation is positive and to determine a separation distance between the first object and the second object based on a time taken from transmission of the search signal to receipt of the reply signal at said search module; and wherein the transponder of the first object sends two successive search signals, each of said successive search signals being transmitted in a respective predetermined search repetition period and repeating the process for a next target address.

19. The system of claim 18, wherein the search module is configured to receive the address of the transponder of the second object n the reply signal and the search module is configured to locally validate the address included in said received reply signal for the transponder of the second object whereby, if the validation is positive, the search module then determines the separation distance.

20. A method of determining a separation distance between a first object and a second object where each of the first and second objects has a respective transponder with a respective unique address, the method comprising the steps of:
  transmitting a search signal on a first frequency from the transponder of the first object, said search signal including the address of the transponder of the first object and the address of the transponder of the second object;
  receiving the search signal transmitted by the transponder of the first object at the transponder of the second object;
  processing said received search signal at the transponder of the second object to locally validate the address included in said received search signal for the transponder of the second object and, if the validation is positive;
  transmitting a reply signal on a second, different frequency from the transponder of the second object;
  receiving the reply signal transmitted by the transponder of the second object at the transponder of the first object;
  processing said received reply signal at the transponder of the first object to determine the separation distance between the first object and the second object based on a time taken from transmission of the search signal to receipt of the reply signal at said transponder of the first object;
  wherein at least one of the first object and the second object comprises a vehicle movable along a pathway comprising any of: a defined pathway; a road lane; a railway track; or a tramway track; and
  wherein the reply signal includes pathway data identifying the pathway for the vehicle of the transponder of the second object and the transponder of the first object utilizes the pathway data to determine if the first vehicle is on a same pathway as the object or vehicle of the transponder of the second object.

21. A system for determining a separation distance between a first object and a second object, the system comprising:
  a search module associated with the first object, said search module comprising a transponder of the first object having a unique address;
  the search module being configured to transmit a search signal on a first frequency to a second transponder associated with the second object, said second transponder having a different, unique address, said search signal including the address of the transponder of the first object and the address of the transponder of the second object, the search signal being for receipt and processing at the transponder of the second object to locally validate at least the address of the transponder of the second object included in said search signal;
  the search module being configured to receive on said second, different frequency a reply signal transmitted by the transponder of the second object if the validation is positive and to determine a separation distance between the first object and the second object based on a time taken from transmission of the search signal to receipt of the reply signal at said search module;
  wherein at least one of the first object and the second object comprises a vehicle movable along a pathway comprising any of: a defined pathway; a road lane; a railway track; or a tramway track; and
  wherein the reply signal includes pathway data identifying the pathway for the vehicle of the transponder of the second object and the transponder of the first object utilizes the pathway data to determine if the first vehicle is on a same pathway as the object or vehicle of the transponder of the second object.

* * * * *